United States Patent [19]

Sticht

[11] Patent Number: 4,778,043
[45] Date of Patent: Oct. 18, 1988

[54] VIBRATORY CONVEYOR

[75] Inventor: Walter Sticht, Attnang-Pucheim, Austria

[73] Assignee: STWIA-Fertingungstechnik Sticht Gesellschaft m.b.H., Attnang/Puchheim, Austria

[21] Appl. No.: 4,315

[22] Filed: Jan. 5, 1987

Related U.S. Application Data

[60] Continuation of Ser. No. 725,117, Apr. 19, 1985, abandoned, which is a division of Ser. No. 470,916, Mar. 1, 1983, abandoned.

[30] Foreign Application Priority Data

Mar. 12, 1982 [AT] Austria ............................ 991/82
Jan. 17, 1983 [AT] Austria ............................ 126/83

[51] Int. Cl.⁴ ............................................ B65G 47/24
[52] U.S. Cl. ............................ 198/389; 198/396
[58] Field of Search ............ 148/389, 391, 396–398; 221/159, 171

[56] References Cited

U.S. PATENT DOCUMENTS

| | | | |
|---|---|---|---|
| 2,939,567 | 6/1960 | Mazura et al. | 198/396 |
| 3,150,762 | 9/1964 | Tricinci | 198/391 |
| 3,189,157 | 6/1965 | Batchelder | 198/397 |
| 3,414,111 | 12/1968 | Ernest | 198/391 |
| 3,841,471 | 10/1974 | Mead | 198/396 |
| 3,939,966 | 2/1976 | Szenczy | 198/391 |
| 4,063,642 | 12/1977 | Sticht et al. | 198/398 |
| 4,175,654 | 11/1979 | Lodge | 198/398 |
| 4,236,302 | 12/1980 | Kuehling | 198/391 |
| 4,328,887 | 5/1982 | Beard et al. | 198/396 |
| 4,461,380 | 7/1984 | Grikis | 198/389 |

FOREIGN PATENT DOCUMENTS

| | | |
|---|---|---|
| 1481027 | 7/1969 | Fed. Rep. of Germany . |
| 2744804 | 4/1978 | Fed. Rep. of Germany . |
| 812802 | 4/1959 | United Kingdom . |
| 927320 | 5/1963 | United Kingdom . |
| 963835 | 7/1964 | United Kingdom . |
| 1084687 | 9/1967 | United Kingdom . |
| 1145505 | 3/1969 | United Kingdom ............ 198/396 |
| 1208995 | 10/1970 | United Kingdom . |
| 1235429 | 6/1971 | United Kingdom . |
| 1267250 | 3/1972 | United Kingdom . |
| 1443118 | 7/1976 | United Kingdom . |

Primary Examiner—Joseph E. Valenza
Attorney, Agent, or Firm—Kurt Kelman

[57] ABSTRACT

A conveyor arrangement for assembly parts, which comprises a rectilinear vibratory conveyor track comprising at least two detachably mounted conveyor track parts arranged in different planes and constituting guide members for the assembly parts, a device separate from the conveyor track for feeding the assembly parts thereto, and a vibrating drive for the conveyor track.

4 Claims, 1 Drawing Sheet

4,778,043

VIBRATORY CONVEYOR

CROSS-REFERENCE TO RELATED APPLICATION

This is a continuation of co-pending application Ser. No. 725,117, filed Apr. 19, 1985, now abandoned, which is a division of application Ser. No. 470,916 filed Mar. 1, 1983, now abandoned.

FIELD OF THE INVENTION

The present invention relates to a vibratory conveyor for conveying assembly parts in a conveying direction and comprising a conveyor track, a drive for vibrating the conveyor track and assembly part handling means on the conveyor track for orienting and/or classifying and/or singling the assembly parts.

DESCRIPTION OF THE PRIOR ART

Such a vibratory conveyor is disclosed, for example, in U.S. Pat. No. 4,063,642. It comprises a plate oscillated by a vibrating drive and whose upper surface has a saw-tooth cross section to define a series of longitudinally extending grooves along which individual assembly parts may move. By milling these grooves along a predetermined length, a balancing edge is provided for assembly parts which are not entirely supported on the portion of the groove which has not been milled, thus causing these parts to tip over the edge and fall laterally off the plate surface. Furthermore, deflectors are mounted on the plate to engage upwardly projecting portions of assembly parts whereby these parts are either oriented into the correct position or removal from the plate. Such vibratory conveyors have been used with considerable success but the manufacture of the plates with balancing edges and deflectors is very labor-intensive and requires high precision work. Furthermore, they do not readily handle assembly parts having downwardly projecting ends.

In the vibratory conveyor disclosed in Accepted German patent specification No. 1,274,981, the conveyor track is comprised of a grid formed of intersecting rods defining openings therebetween. When the grid is vibrated, assembly parts whose head portion has a diameter exceeding the diameter of a shaft portion will be suspended in the openings by the head portion if the diameter of the openings exceeds that of the shaft portion but is smaller than that of the head portion. Such a vibratory conveyor can be used only for very specifically shaped assembly parts, any change in the respective diameters of the parts requiring a different grid.

SUMMARY OF THE INVENTION

It is the primary object of this invention to provide a vibratory conveyor simply and readily adaptable for handling different assembly parts, and whose manufacturing costs are relatively low.

The above and other objects are accomplished according to the invention in a conveyor arrangement for assembly parts, which comprises a rectilinear vibratory conveyor track comprising at least two conveyor track parts arranged in different planes and constituting guide members for the assembly parts, means for detachably mounting at least one of the conveyor track parts, means separate from the conveyor track for feeding the assembly parts thereto, and a vibrating drive for the conveyor track.

This arrangement has the advantage that the conveyor track parts may be readily exchanged to adapt the conveyo to differently shaped assembly parts. Therefore, such different assembly parts may be handled by the vibratory conveyor of the present invention with a minimum down-time between the handling of the different parts. Since such conveyor tracks may be mass-produced in large numbers, relatively cheap standard vibratory conveyors may be used for all types of assembly parts, for which individual conveyors had to be provided heretofore.

Furthermore, this arrangement enables the conveyed assembly parts to be roughly oriented and to remove from the conveyor track any superimposed or entangled parts. At the same time, the detachable conveyor parts may be quickly adjusted to differently shaped or sized assembly parts. If the carrier plate for the conveyor track parts is inclined to the horizontal, superimposed assembly parts will slide off the plate over the top of the guide member, depending on its height. Any parts which fail to slide off will be removed by a guide member constituting a suitably adjusted deflector. The vertical adjustment of the deflector in relation to the dimension of the parts will also cause incorrectly positioned assembly parts or irregular parts, for instance springs having the wrong diameter, to be removed.

BRIEF DESCRIPTION OF THE DRAWINGS

The above and other objects, advantages and features of the invention will become more apparent from the following detailed description of certain now preferred embodiments thereof, taken in conjunction with the accompanying schematic drawing wherein.

DETAILED DESCRIPTION OF PREFERRED EMBODIMENTS

Figure 1:
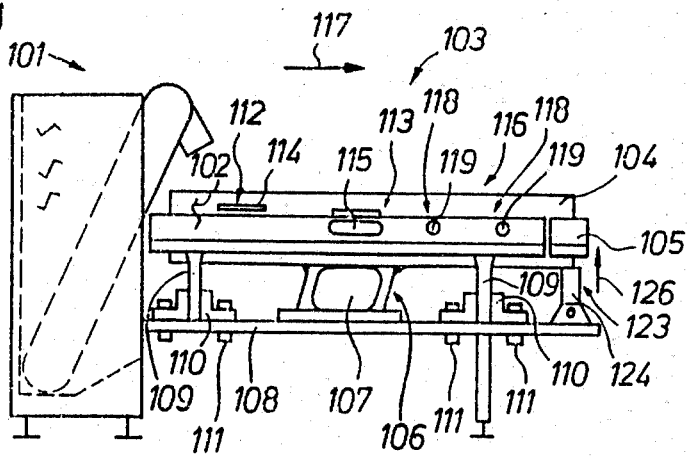
FIG. 1 is a simplified side elevational view of another embodiment of a vibratory conveyor preceded by a feeding and singling means for the assembly parts.
Figure 2:
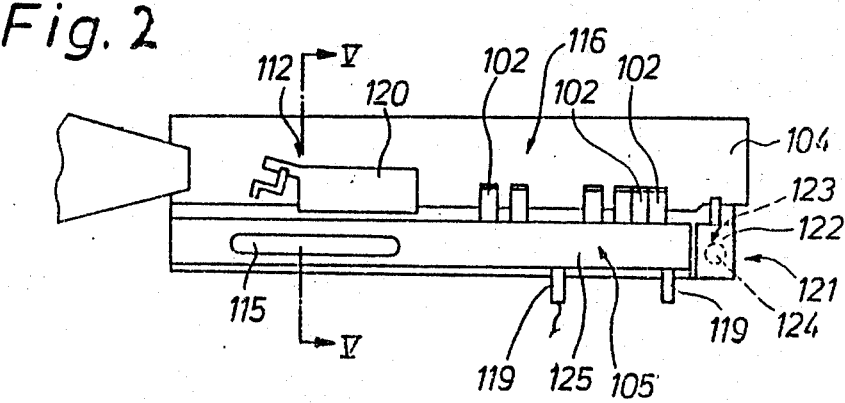
FIG. 2 is an enlarged top view of the conveyor of FIG. 1.
Figure 3:
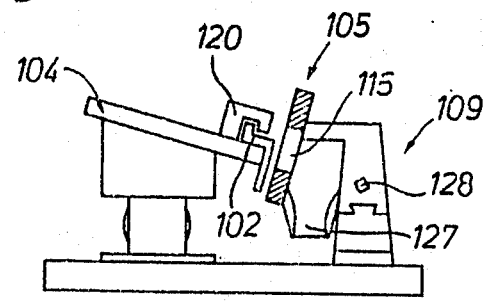
FIG. 3 is a sectional view along line V—V of FIG. 2.

In the drawings, there is shown vibratory conveyor 103 with two conveyor parts 104, 105 mounted independently of, and extending parallel to, each other in the conveying direction indicated by arrow 117, conveyor parts 104, 105 being arranged for jointly guiding assembly parts 102 vertically and laterally in a conveying direction, as shown in FIGS. 2 and 3. The one conveyor track part 105 is adjustable into respective stationary positions while vibrating drive 107 is connected to other conveyor track part 104. Means 101 for feeding and, if desired or required, disentangling assembly parts 102 delivers predetermined amounts of the assembly parts to vibratory conveyor 103. This conveyor is arranged to orient the assembly parts so that all conveyed parts have the same, predetermined position at the outlet of the conveyor. Vibrating drive 107 connects conveyor track part 104 to base plate 108 while holders 109 mount conveyor track part 105 on phase plate 108 for adjustment into respective stationary positions. The holders include adjustment means 110 for displaceably adjusting conveyor track part 105 in relation to base plate 108 and conveyor track part 104. The adjustment means comprises a detachable connector illustrated as connecting bolts 111 for detachably mounting conveyor track part 105. This conveyor track part, which remains stationary during operation, has orienting elements 112 constituted by deflectors 114 as well as singling means 113 constituted by openings 115 in conveyor track part 105. Assembly part sensing means 118 comprising proximity fuse switch means 119 are arranged on conveyor track part 105 to enable a portion of the length of conveyor track 116 constituted by conveyor track parts 104, 105 to be used as a buffer zone.

As is shown in FIG. 2, orienting devices 112 constituted by deflectors 120 may also be mounted on vibrating conveyor track part 104. In the illustrated embodiment, conveyor track part 105 defines opening 115 associated with deflector 120 for removing unwanted assembly parts, such as superimposed assembly parts, which singly fall through opening 115. As illustrated, the zone of conveyor track 116 between proximity fuse switches 119 is not yet filled with assembly parts 102. When the assembly parts contact proximity fuse switch 119 closest to opening 115 and thus keep a control circuit closed, operation of vibrating drive 106 as well as assembly part feeding means 101 is discontinued, i.e. no further parts will be fed to the conveyor and the conveyor track will be further vibrated. The control will switch these operations on again when proximity fuse switch 119 closest to singling device 121 does not transmit a control signal, i.e. when it is not contacted by an assembly part 102. Singling device 121 comprises part 122 which is displaceably adjustable vertically in the direction of arrow 126 in relation to base plate 108 and conveyor track part 104. Drive 123 illustrated as jack 124 is connected to singling device part 122 for vertically displacing the same.

The adjustability of the one conveyor track part relative to the other in a vertical and/or lateral direction enables the conveyor track rapidly to be adapted to various sizes of the same series of assembly parts. Detachably mounting the conveyor track part or parts enables the conveyor quickly to be converted for universal use. Defining the opening for the removal of unwanted assembly parts in the stationary conveyor track part has the advantage that less precision is required in making these openings because this stationary part is more readily adjusted.

As shown in FIG. 2, deflector 120 on conveyor track part 104 will push superimposed assembly parts 102 into opening 115 of conveyor track part 105, the opening leading into chute 127 which returns the rejected assembly parts to feeding and singling means 101. Holder 109, on which conveyor track part 105 is mounted, is comprised of two portions interconnected by a dove-tailed joint. In this manner, the upper holder portion carrying the conveyor track part may be readily detached and another conveyor track part adapted to handle different assembly parts may be mounted on the holder. The two detachable holder portions are fixed together by bolt 128.

Since orienting device 112 with deflectors 120 is mounted on vibrating conveyor track part 104, the vibration of assembly parts 102 will sufficiently shake the parts to facilitate their conveyance and to avoid jamming in the range of opening 115. Since conveyor track part 104 is spaced from conveyor track part 105, no recesses need to be milled in conveyor track part 104 to receive downwardly projecting portions of assembly parts 102 because these portions can project into the space between the two conveyor track parts. As shown, conveyor track part 104 is inclined towards conveyor track part 105. This arrangement is of particular advantage with cylindrical assembly parts because the inclined conveyor track will automatically orient these assembly parts in the same direction, thus facilitating the orientation and singling of the assembly parts.

It will be understood by those skilled in the art that any type of means may be used for feeding the assembly parts to the vibratory conveyor, including elevators, chutes or vibratory conveyor pots. The use of the displaceably adjustable conveyor track parts for handling the conveyed assembly parts, i.e. for classifying, or singling or orienting them in one or two directions, has the advantage that they may be arranged in connection with a plane carrier plate for defining the conveyor path for the assembly parts. In this manner, standard carrier plates may be used with a multiplicity of different parts, which is very economical.

What is claimed is:

1. A conveyor arrangement for conveying assembly parts in a conveying direction, which comprises
    (a) a base plate,
    (b) a horizontally extending rectilinear conveyor track comprising
        (1) two conveyor track parts mounted on said base plate independently of each other and extending in different planes parallel to the conveying direction, the conveyor track parts constituting guide members for jointly guiding the assembly parts vertically and laterally in the conveying direction,
    (c) means for detachably and displaceably mounting at least one of the conveyor track parts on the base plate for vertical and lateral adjustment of one conveyor track part in relation to the other conveyor track part,
    (d) means separate from the conveyor track for feeding the assembly parts thereto, and
    (e) a vibrating drive connected only to one of the conveyor track parts for vibrating the one conveyor track part and for imparting a conveying motion to the assembly parts in the conveying direction parallel to the conveying track.

2. The conveyor arrangement of claim 1, further comprising holding means for the detachably mounted conveyor track part and said detachable mounting means comprises detachable connecting elements for detachably mounting the holding means and the conveyor track part mounted thereon.

3. The conveyor arrangement of claim 1, further comprising means arranged on the other track part for handling the assembly parts.

4. The conveyor arrangement of claim 1, wherein the detachably and displaceably mounted conveyor track part is a guide ledge for the assembly parts for laterally guiding the assembly parts and the one conveyor track part is a carrier plate vertically guiding the assembly parts.

* * * * *

UNITED STATES PATENT AND TRADEMARK OFFICE
CERTIFICATE OF CORRECTION

PATENT NO. : 4,778,043
DATED : October 18, 1988
INVENTOR(S) : WALTER STICHT

It is certified that error appears in the above–identified patent and that said Letters Patent are hereby corrected as shown below:

Cover page, item 73, correct Assignee's name: --STIWA-Fertigungstechnik--.

Signed and Sealed this

Twenty-fifth Day of April, 1989

Attest:

DONALD J. QUIGG

Attesting Officer

Commissioner of Patents and Trademarks